US 6,750,621 B2

(12) United States Patent
Gandrud

(10) Patent No.: US 6,750,621 B2
(45) Date of Patent: Jun. 15, 2004

(54) METHOD AND SYSTEM FOR NON-CONTACT SENSING OF MOTION OF A ROLLER DRUM

(75) Inventor: Michael D. Gandrud, Ames, IA (US)

(73) Assignee: Sauer-Danfoss Inc., Ames, IA (US)

( * ) Notice: Subject to any disclaimer, the term of this patent is extended or adjusted under 35 U.S.C. 154(b) by 103 days.

(21) Appl. No.: 09/950,894

(22) Filed: Sep. 10, 2001

(65) Prior Publication Data

US 2003/0048082 A1 Mar. 13, 2003

(51) Int. Cl.[7] .......................... E01C 19/38; H02K 33/00
(52) U.S. Cl. ........................ 318/114; 73/593; 404/117
(58) Field of Search .......................... 73/579, 583, 584, 73/587, 593; 404/113, 117, 122, 128; 318/114; 310/20, 51, 80, 81, 82

(56) References Cited

U.S. PATENT DOCUMENTS

| | | | |
|---|---|---|---|
| 3,604,804 A | * 9/1971 | Penney et al. | 356/28 |
| 3,778,177 A | 12/1973 | Haker et al. | 404/117 |
| 3,911,731 A | * 10/1975 | Walker et al. | 73/660 |
| 4,621,263 A | 11/1986 | Takenaka et al. | 340/870.07 |
| 4,777,825 A | 10/1988 | Barr et al. | 73/657 |
| 4,870,601 A | 9/1989 | Sandstrom | 702/43 |
| 5,325,055 A | 6/1994 | Geringer | 324/173 |
| 5,415,494 A | * 5/1995 | Steffen | 404/72 |
| 5,440,300 A | 8/1995 | Spillman, Jr. | 340/10.34 |
| 5,579,246 A | * 11/1996 | Ebersbach et al. | 702/95 |
| 5,727,900 A | 3/1998 | Sandstrom | 404/84.1 |
| 5,797,699 A | * 8/1998 | Blancke et al. | 404/117 |
| 5,890,569 A | * 4/1999 | Goepfert | 188/378 |
| 6,146,268 A | * 11/2000 | Behnke et al. | 460/4 |
| 6,181,273 B1 | * 1/2001 | Heide et al. | 342/130 |
| 6,186,004 B1 | 2/2001 | Kaduchak et al. | 73/596 |
| 6,234,021 B1 | * 5/2001 | Piety et al. | 73/592 |
| 6,489,917 B2 | * 12/2002 | Geisheimer et al. | 342/127 |
| 6,498,996 B1 | * 12/2002 | Vallot | 702/104 |
| 6,551,019 B1 | * 4/2003 | Motz et al. | 73/573 |
| 6,619,125 B2 | * 9/2003 | Laugwitz | 73/573 |

* cited by examiner

Primary Examiner—Burton S. Mullins
Assistant Examiner—Judson H. Jones

(57) ABSTRACT

The present invention discloses a system for non-contact measurement of vibrational motion in a vibratory compacting machine. The system includes a vibrating element such as a roller drum adapted for vibrational motion and a non-contact sensor positioned a distance from the vibrating element and adapted for sensing the vibrational motion of the vibrating element. The present invention also discloses a method for non-contact measurement of vibrational motion of a vibrating element in a vibrating element that includes sensing position information of the roller drum with a non-contact sensor positioned a distance from the vibrating element and determining at least one vibration characteristic based on the position information sensed with the non-contact sensor.

33 Claims, 10 Drawing Sheets

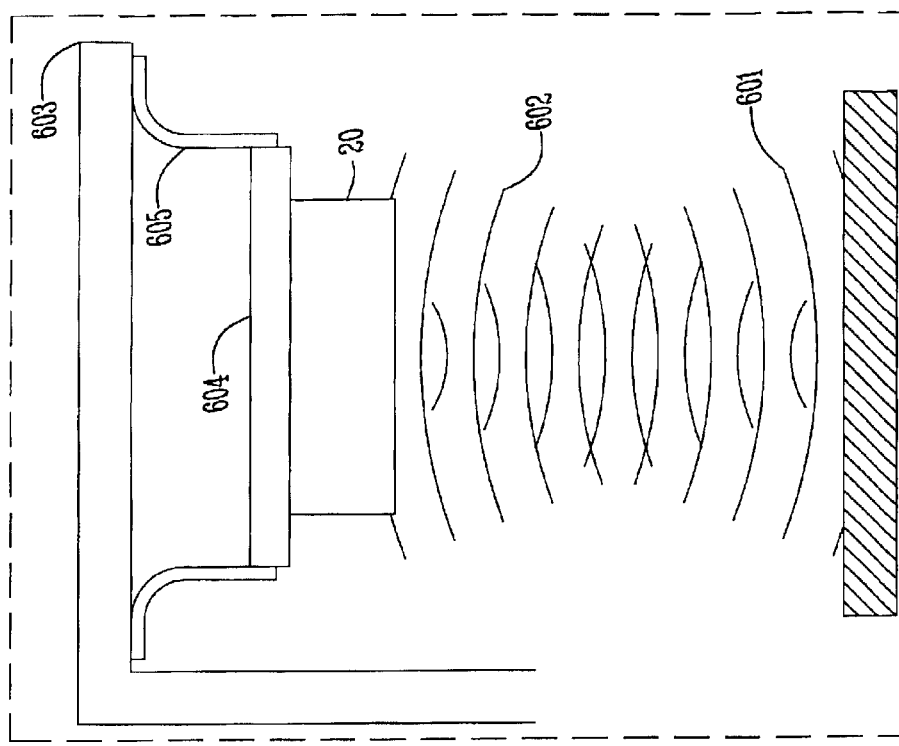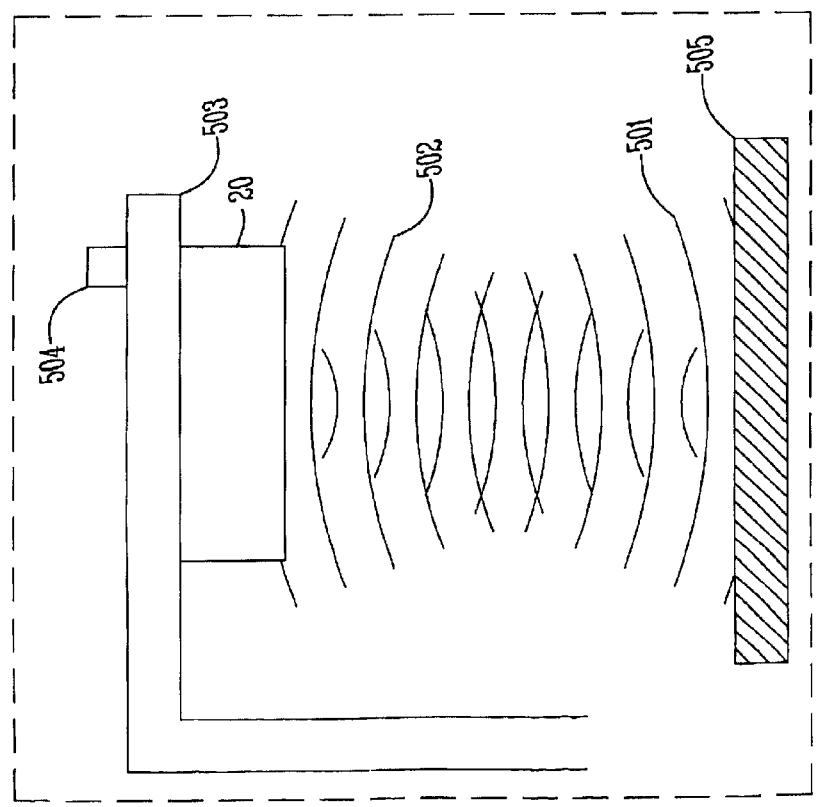

METHOD AND SYSTEM FOR NON-CONTACT SENSING OF MOTION OF A ROLLER DRUM

BACKGROUND OF THE INVENTION

This invention relates to non-contact sensing of motion of a vibrating element on vibratory compacting machines. More specifically, the invention relates to use of a non-contact sensor and control system to determine and control vibrational amplitude, vibrational frequency, phase, and vibrational waveform of vibrating elements.

Vibratory compacting machines are used to compact soils, compact refuse, compact asphalt pavement, and for other purposes. Vibratory compacting machines often include one or two heavy steel drums which are capable of compacting surfaces by rolling over them. Alternatively, machines may incorporate a vibrating plate which serves a similar purpose. Each vibrating element may include a means of vibrating a element for enhanced compacting performance. For example, the roller drum may contain an eccentric mass turned by hydraulics. This allows the drum to shake. The eccentric mass may be turned at different speeds thus causing differing intensities and frequencies of vibration. Asphalt pavement, soils, and other materials are alternatively compacted by a weighted vibrating plate which is slid across the surface.

The intensity of vibration is related to the speed at which the eccentric mass is turned, and the geometry and mass of the eccentric mass. Where an eccentric mass is revolved to create a vibration, turning the eccentric mass at increased speeds results in increased intensity of the vibration of the roller drum. A heavier eccentric mass, or a more eccentric mass will also cause more intense vibration. Where an eccentric mass is the mechanism for vibrating a roller drum, the drum will move (vibrate) up and down once with each rotation of the of the eccentric mass. In other words, if the eccentric mass is rotating at 3000 revolutions per minute (3000 RPM), then the drum will be vibrating at 3000 vibrations per minute (3000 VPM). Most vibratory compacting machines have a mechanism for adjusting the speed of rotation of the eccentric mass. Some vibratory compacting machines also have a mechanism for adjusting or selecting one of several eccentric masses to be rotated. Selection of optimal rotational speed (vibrational frequency) and optimal eccentric mass setting will result in the desired compacting performance. Selection of non-optimal rotational speed and eccentric mass setting could lead to poor or undesired compacting performance, operator discomfort, or excessive wear and damage to the vibratory compacting machine. The present invention is capable of measuring and controlling vibrational speed, vibrational amplitude, and vibrational phase regardless of the mechanism used to cause such vibration.

Currently, speed sensors are used to measure the rotational speed of an eccentric mass. Speed sensors are often incorporated into hydraulic motors which are often used to turn eccentric masses within vibrating elements. One common type of speed sensor creates a fixed number of electrical pulses for each rotation of the shaft. A speed sensor may also incorporate a means of determining its absolute position within the rotational cycle. One embodiment of an absolute position sensor is a system that produces an electrical pulse at a certain fixed point during each revolution of a rotating shaft. Examples of using speed sensors are given in U.S. Pat. No. 5,325,055 to Gerringer.

Although the speed of rotation and therefore frequency of vibration are determined from use of a speed sensor, information concerning the vibration of the roller drum is not determined. In particular, the vibration amplitude is not determined, and the phase of the vibration, and vibration waveform are not determined.

Other attempts have also been made at improving the quality of information that can be derived from a sensor. For example, piezoelectric accelerometers have been used for the purpose of measuring roller drum vibration. If a piezoelectric accelerometer is mounted to the roller drum, a means must be provided to send the vibration measurements from the rotating drum to the fixed portion of the machine. Wires are not used since wires would become wrapped up and twisted by the rotation of the roller drum. Radio telemetry or slip ring systems may be used for this purpose during development and testing of a vibratory compactor. Factors such as cost and reliability prevent such systems from being widely used in production machines.

Another prior art attempt has used magnetic circuits. For example, U.S. Pat. No. 4,330,738 to Paramythioti et al uses a magnetic circuit as a vibration pickup. One deficiency of this type of system is that the vibration pickup requires a marker armature of magnetic material in contact with the vibrating element in order to complete the magnetic circuit and therefore is not a non-contact sensor. Further, this arrangement is susceptible to magnetic interference resulting in imprecision and/or errors in measurement.

Therefore, there are a number of problems associated with determining and controlling vibration of roller drums. Thus, it is a primary object of the present invention to provide an improved system and method for determining vibratory motion of a vibrating element.

Another object of the present invention is to provide a system and method for determining vibratory motion of a roller drum that does not require contact between a sensor and the vibrating element.

A further object of the present invention is to provide a system and method for non-contact sensing of motion of a vibrating element that can determine the amplitude of vibration of the vibrating element.

Yet another object of the present invention is to provide a system and method for non-contact sensing of motion of a roller drum that provides for determining the frequency of vibration of a vibrating element.

A still further object of the present invention is to provide a system and method for non-contact sensing of motion of a vibrating element that provides for determining a phase difference between a first vibrating element and a second vibrating element.

Another object of the present invention is a system and method for sensing and controlling the phase difference between the rotation of an eccentric and the vibrational motion of a vibrating element.

Yet a further object of the present invention is to provide a system and method for sensing of motion of a roller drum that provides for independently adjusting a vibratory motion in one or more vibratory elements based upon the sensed vibratory motion.

Another object of the present invention is to provide a method and system for determining the selection or adjustment of the eccentric mass that should be used to cause desired vibratory motion.

Another object of the present invention is to provide a system and method for non-contact sensing of motion of a roller drum that is low cost and mass producable.

Another object of the present invention is the ability to prevent undesired vibrations of the framework to which the sensor might be attached from interfering with the ability of the sensor to make accurate measurements.

Another object of the present invention is a system which is capable of determining the precise waveform of vibratory motion of a vibrating compaction element.

It is a further object of the present invention to provide a method and system for non-contact sensing of motion of a roller drum that does not rotate with the drum.

These and other objects of the present invention will become apparent from the following description.

BRIEF SUMMARY OF THE INVENTION

The invention is a system and method for non-contact sensing and control of the motion of vibrating compaction elements. A non-contact sensor uses radio, radar, microwave, light, optical, sonic, acoustic, capacitive proximity, or inductive proximity sensing to determine the vibratory motion of a roller drum. Such a device is capable of sensing the vibrational amplitude, vibrational frequency, vibrational phase difference between two or more elements. A control system which is able to sense these vibrational characteristics is able to optimize speed, phase, and eccentric mass of each of the one or more eccentrics which vibrate one or more vibrating compacting members. A further feature of the present invention is a means of insuring that accurate measurements are made even if the machine member to which the sensor is mounted experiences undesired vibrations. As this additional information concerning motion of the vibrating element is detected in the current system, improved control results.

In particular, the present invention provides for control that is based upon the actual vibratory motion of one or more vibrating elements, as opposed to merely being based upon motion of an eccentric mass or other means of vibration within the vibrating element. As the vibratory motion of the vibrating element is measurable with the present invention, the information needed for improved control is available.

BRIEF DESCRIPTION OF THE DRAWINGS

FIG. 5 is a diagram that shows a sensor mounted with an accelerometer to correct for the effect of frame vibration.

FIG. 6 is a diagram that shows a sensor mounted to a dampening system.

DETAILED DESCRIPTION OF THE INVENTION

Figure 1:
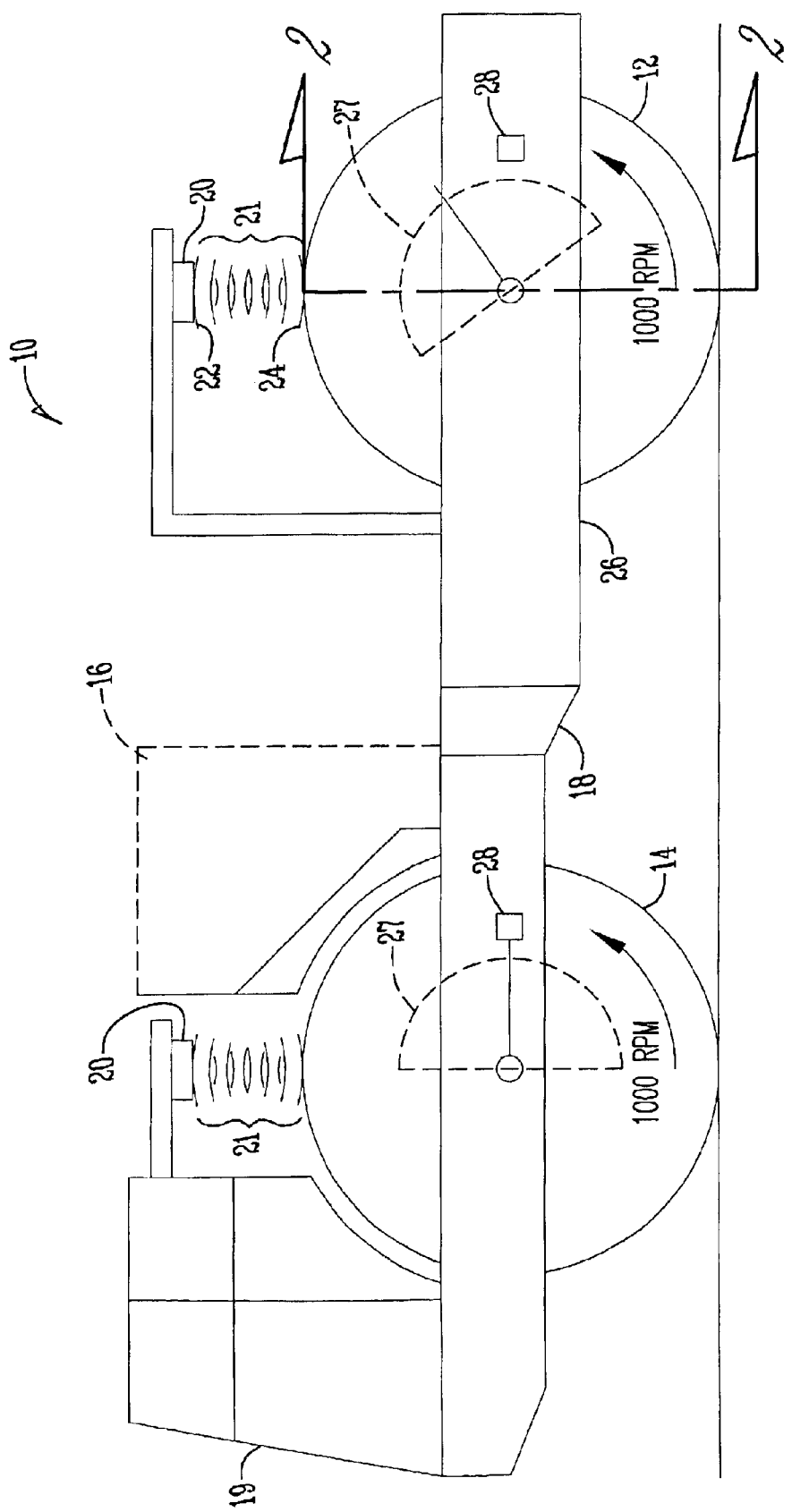
FIG. 1 is a diagram of a roller type vibratory compacting machine according to the present invention.

FIG. 1 is a diagram of a drum roller according to the present invention. In FIG. 1, drum type vibratory compacting machine 10 has a front roller drum 12. In addition, drum type vibratory compacting machine 10 has either a rear roller drum or a rubber tire 14. The roller drum 10 and optionally, roller drum 14, are rollably mounted onto a frame 26. The frame 26 includes a steering articulation joint 18. The drum type vibratory compacting machine has an engine 19 and a control area 16. In the control area 16 is an operator seat and machine controls. Eccentric masses 27 are rotatibly mounted within each roller drum. Eccentric masses rotate at a desired speed usually in the range of 500 to 8000 RPM.

Although the vibrating element used in FIG. 1 is of the rolling drum type, the present invention provides for vibrating elements to be of a plate type or other geometries such as may be appropriate for a particular application or operating environment. Further the eccentric mass 27 is revolved to create a vibration. The present invention contemplates other methods of creating and controlling a vibration, revolution of an eccentric mass is simply one common and convenient method.

According to the present invention, a non-contact sensor 20 is positioned a distance 21 from a roller drum 12. The non-contact sensor 20 is adapted for sensing the vibrational motion of the roller drum 12. Another sensor 28 is optionally used to determine the phase of rotation of the eccentric masses 27.

Figure 2:
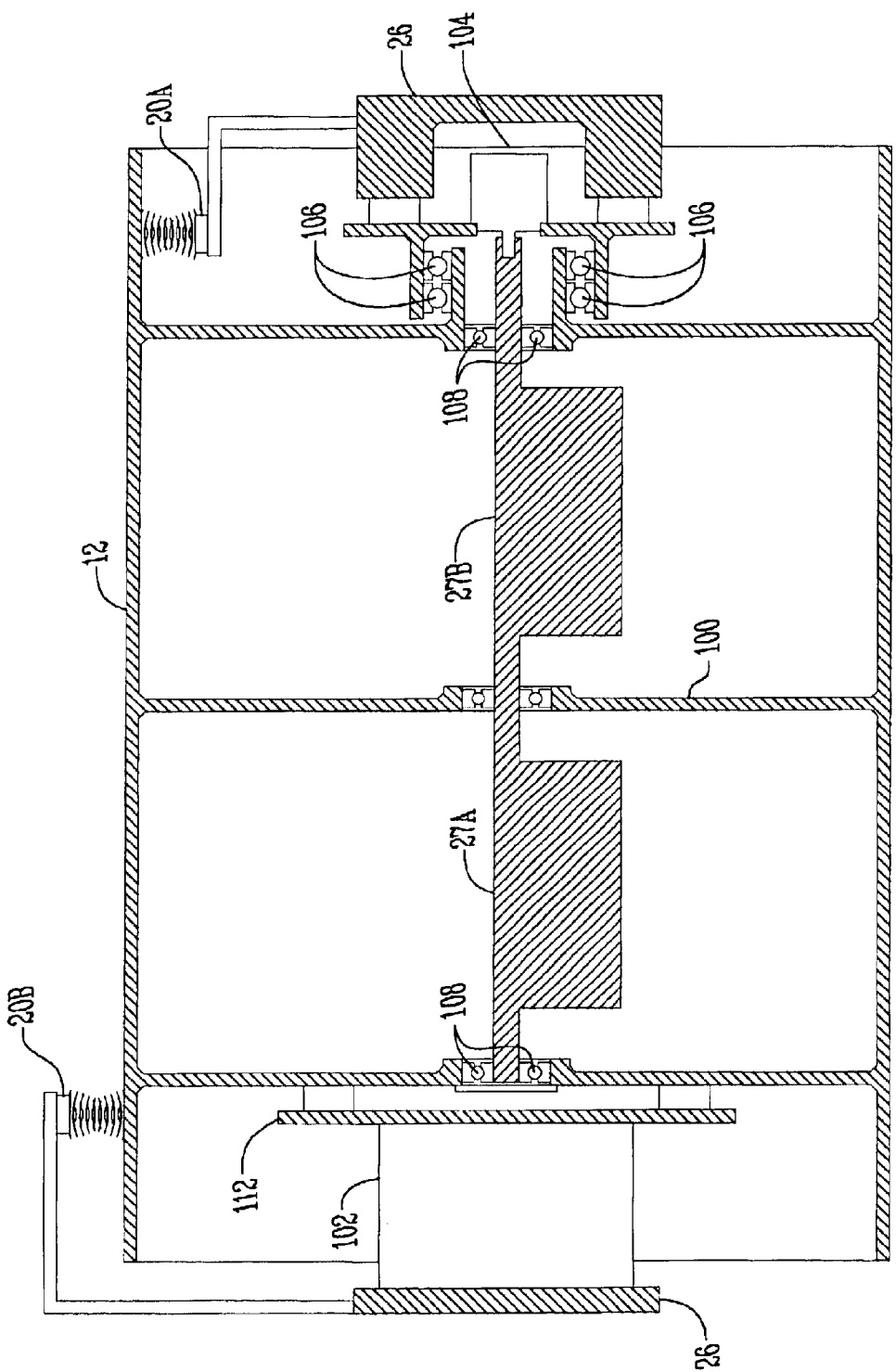
FIG. 2 is a diagram of a cross section of a roller drum.

FIG. 2 is a diagram of a cross sectional view of a roller drum 12 at line 2—2 shown in FIG. 1. The drum 12 is generally a steel ring or tube of several feet in diameter. Several divider disks 100 may be installed within the roller drum 12 to support the eccentric masses 27A and 27B, for rollably mounting the roller to the vehicle frame 26, and for other purposes. On one side, a means, such as a hydraulic motor or gearbox 102 may be provided for causing the drum 12 to turn or roll relative to the machine frame 26. FIG. 2 shows a means such as a hydraulic motor 104 or other motor on the other end of the drum 12 for turning the eccentric mass 27. One or more bearings 108 are used to support the eccentric masses mounted to the shaft 110. Turning the eccentric mass(es) 27 causes the drum 12 to vibrate. The drum 12 is isolated from the vehicle frame 27 by rubber vibration isolators 112 or another appropriate means. Two possible locations for a non contact vibration sensor 20A and 20B are shown on FIG. 2 though a whole range of many other locations are contemplated. Sensor 20A is within the end of the roller and faces the inside diameter of the roller drum. Sensor 20B is outside of the drum and faces the outside diameter of the drum. Other aspects of the roller drum are commonly known within the art and are therefore not disclosed herein.

Figure 3:
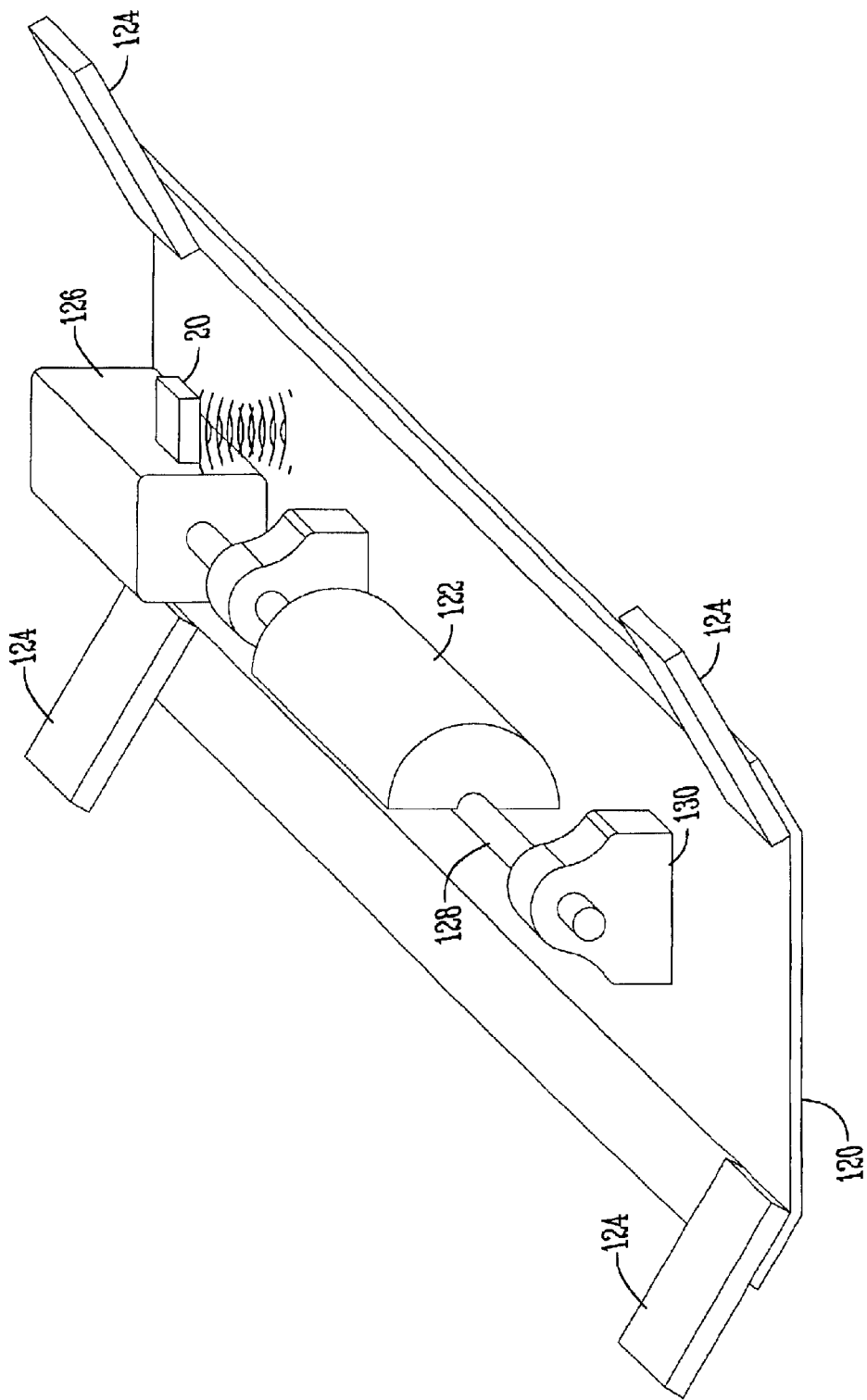
FIG. 3 is a diagram of a vibrating plate.

FIG. 3 is a diagram of a vibrating plate. The plate 120 is caused to vibrate by a rotating eccentric mass 122 or by other means. The plate 120 is attached to and vibrationally isolated from the frame of the machine by one or more rubber vibration isolators 124. A hydraulic or other motor 126 causes the eccentric mass 122 mounted on shaft 128 to rotate. An eccentric mass 122 is attached to the plate 120 by one or more bearings 130. A non contact vibration sensor 20 is used to sense the vibration of the plate 120 according to the present invention.

Figure 4:
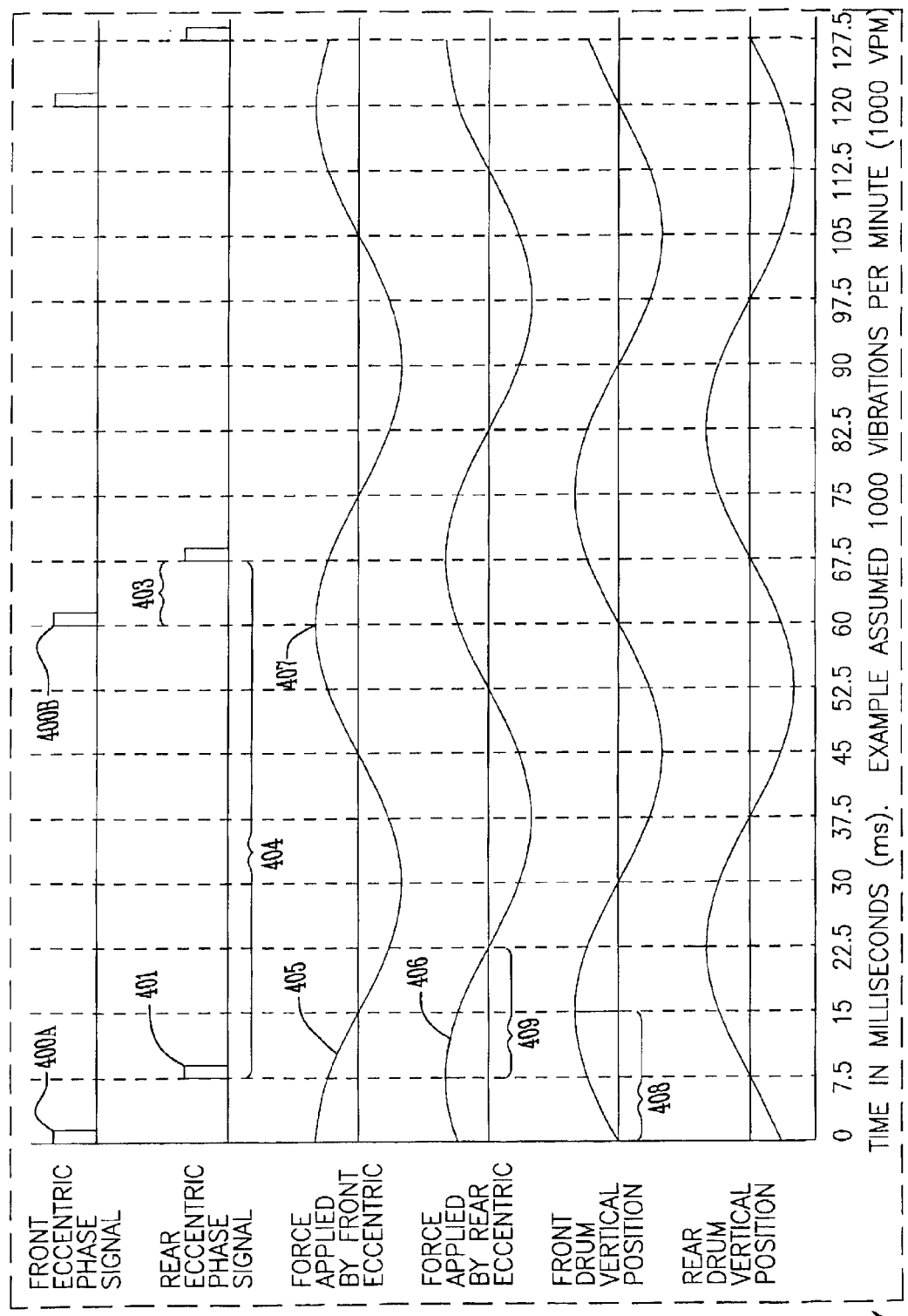
FIG. 4 is a diagram that shows various signals.

FIG. 4 is a diagram of several signals and forces. Each of the one or more eccentrics optionally has a sensor which senses the position of the eccentric as it rotates. This sensor provides a short electrical pulse (400, 401) at a fixed time during each rotation of an eccentric or a signal of another type. The first signal shown in FIG. 4 depicts a pulse 400 which occurs once every rotation. The second signal depicts a similar pulse for the rear eccentric 401. In FIG. 4, the front and rear eccentrics are shown to be one eighth of a cycle out of phase (45°) 403. This is the phase difference of the eccentrics. Various phase differences are desired for different purposes. Note the times shown in FIG. 4 assume that the eccentric masses are rotating at 1000 Revolutions Per Minute (1000 RPM). One Thousand RPM is equivalent to 1000/60=16.666 revolutions per second. Therefore 1/16.666=0.060 or one revolution occurs in 0.060 seconds, 60 ms is the period shown in 404. As an eccentric mass rotates, it applies a varying force 405 or 406 to the vibrating element. In the example of FIG. 4, the sensor was placed such that the eccentric position sensor provides a pulse at the point at which the eccentric is applying the maximum force to the vibrating element 407. The sensor can also be installed to provide this position pulse at any chosen point during the rotation of the eccentric. Note that the phase pulses for the front and rear eccentric in FIG. 4 occur at the same time as the peak force applied by each respective eccentric as indicated by reference numeral 407. The phase difference between the eccentric position pulse 400 or 401 and the peak vertical movement of the respective roller are indicated by reference numerals 408 and 409, respectively. This is the phase difference between the rotation of each eccentric and the movement of the ground which is indicated by the movement of the vibrating element. By measuring and controlling these phase differences, it is possible to control compacting performance. For instance, it may be desired to adjust the frequency of vibration such that the phase difference between the rotation of the eccentric and the movement of the vibrating element are a 90 degrees phase difference.

FIG. 5 shows one possible method of removing the effect of undesired frame vibration from the measured vibration. A non-contact vibration sensor 500 is mounted in proximity to the surface of a vibrating element 505. Certain types of sensors such as Doppler Radar sensors illuminate the vibrating element with a signal 501. A 2.45 Gigahertz (2.45 GHz) microwave signal is one of many possible signals that can be used. Certain sensors transmit an illuminating signal and receive a reflected signal which is reflected from the surface of the vibrating element 502. One suitable type of sensor is a Doppler shift sensor. Doppler shift sensors measure how the frequency of a reflected microwave signal differs from the frequency of the transmitted signal due to movement of the reflecting surface. The present invention provides for other types of non contact sensors to also be used. The sensor is mounted to some structure. In practice, the structure to which the sensor is mounted generally vibrates although this is not desirable. The sensor measures the distance between itself 500 and the vibrating element 505. If the sensor itself vibrates, this may introduce errors. An accelerometer or similar device 504 may optionally be mounted in proximity to the sensor 500. The accelerometer or similar device 504 will measure the vibration of the sensor 500 and thereby make it possible to remove the effect of undesired sensor vibration from the final measured vibration.

FIG. 6 shows another method of preventing undesired movement and vibration of the structure 603 from interfering with the measurements of the sensor 600 according to the present invention. The sensor 600 is mounted on a device which isolates the sensor from the vibration of the frame. This is accomplished by mounting the sensor to a part that has some mass 603. This part may be a metal block, a box filled with sand or any other weight. The box 603 is attached to the structure 603 with a vibration isolating material 604. This vibration isolation material or component may be made of rubber or other resilient or vibration absorbing material or may be a mechanism such as a spring. In this manner, the sensor is isolated from the vibrations of the machine structure. Undesired vibration of the damping structure can then be removed by filtering. The filter can be implemented in either hardware or software.

Figure 7:
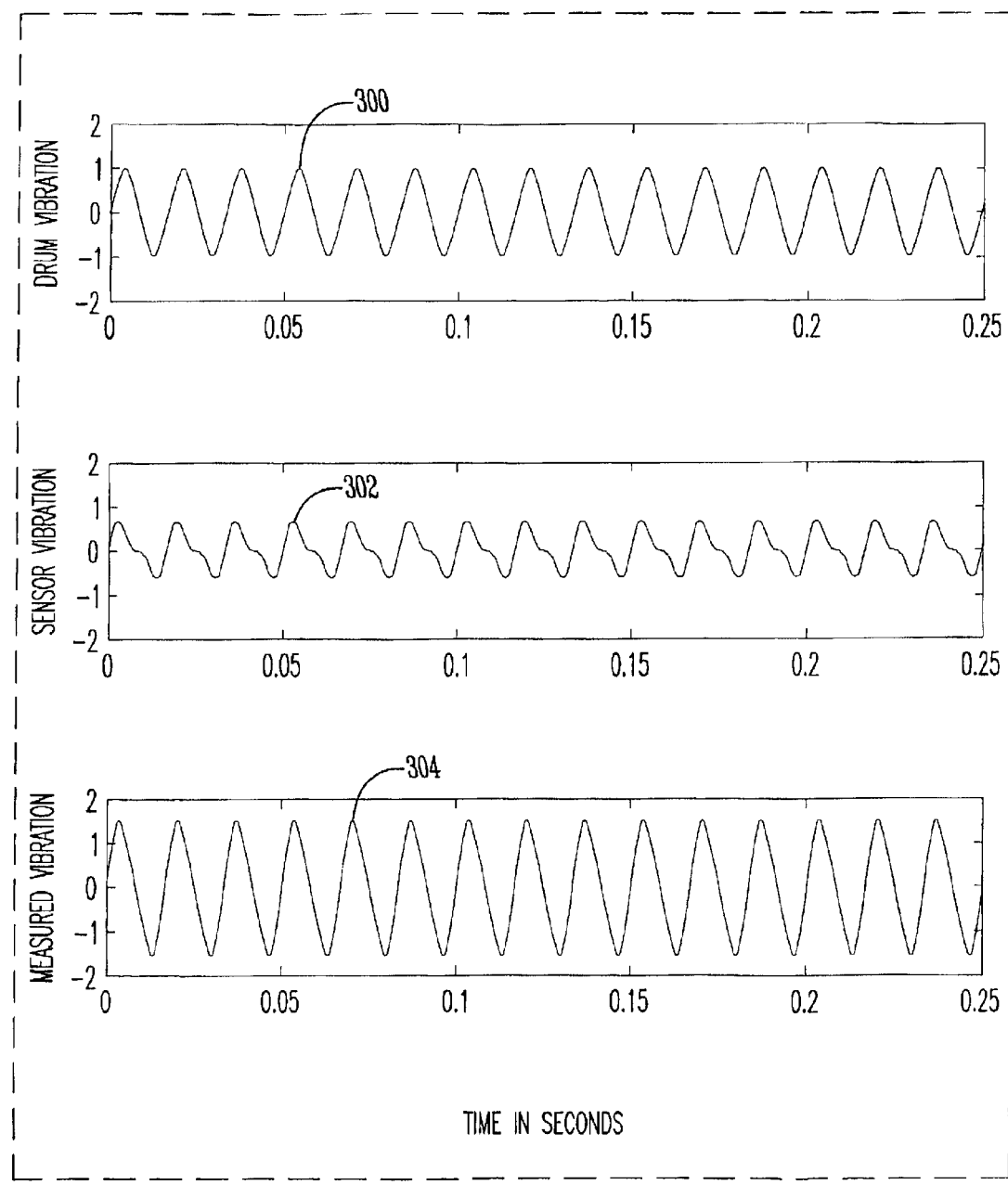
FIG. 7 is a diagram that shows the signal from the system shown in FIG. 5.

FIG. 7 shows three waveforms. Waveform 300 shows a vibration of the roller drum. This is the desired vibration that we wish to measure. Waveform 302 is the undesired vibration of the sensor that results from frame vibration. This vibration 302 is measured by the accelerometer. Waveform 304 represents the vibration that the sensor will actually measure. Waveform 304 represents the sum of the movement of the vibrating element and the movement of the sensor. To find the actual vibration of the vibrating element 300, we take the measured sensor signal 304 and correct it by subtracting the accelerometer signal 302 which leaves the drum vibration signal 300.

Figure 8:
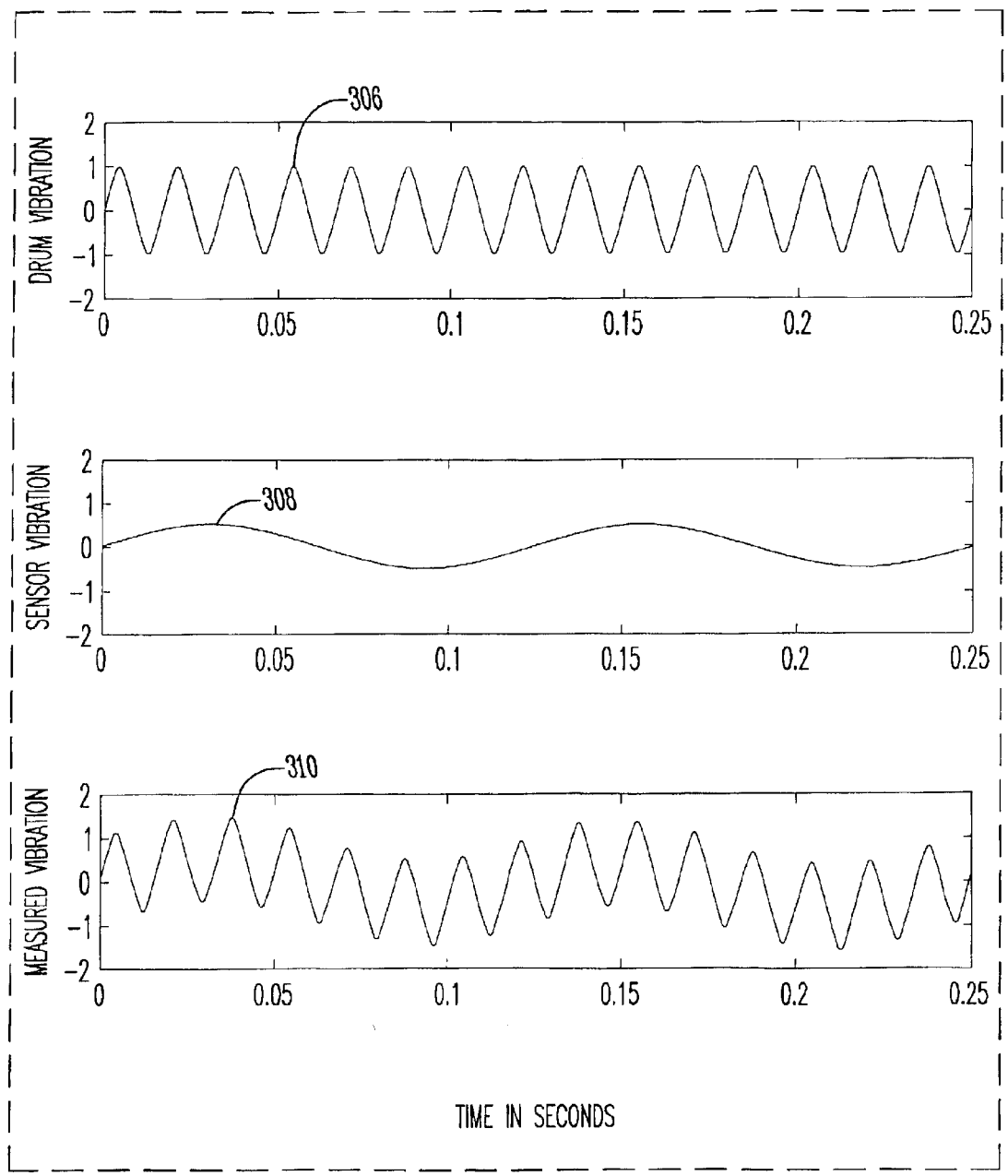
FIG. 8 is a diagram that shows the signals from the system shown in FIG. 6.

FIG. 8 shows three waveforms. Waveform 306 represents a vibration of the roller drum. This is the desired vibration that we wish to measure. Waveform 308 represents the undesired vibration of the sensor that results from vibration of the sensor within the vibration isolation. Waveform 310 represents the vibration that the sensor will actually measure. Note that the vibration isolator was designed such that the frequency at which it vibrates is not within the same range as the drum vibration. In the same manner as above, the sensor will measure some combination of the actual vibration of the vibrating element and some undesired vibration of the sensor. In this example, the drum is vibrating at 60 Hz or 3600 VPM. The sensor is moving at 8 Hz. By techniques of filtering, signal processing or similar methods, the low frequency content is removed from the waveform 310 leaving only the drum vibration 306.

Figure 9:
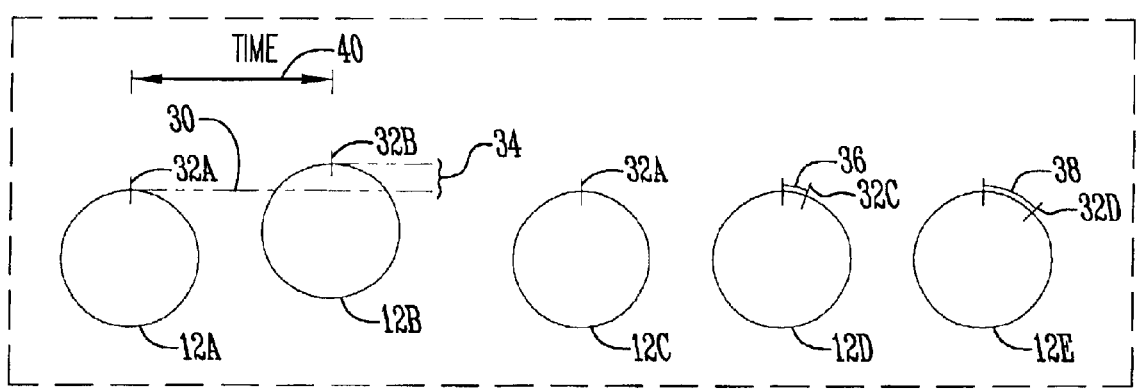
FIG. 9 is a diagram showing vibratory motion of a roller drum.

FIG. 9 is a diagram illustrating aspects of vibratory motion that are detectable by the non-contact sensor 20. In FIG. 9, a roller drum 12 is shown in various positions. A line 30 is drawn tangentially to roller drum 12A. In addition, a point 32A is marked on roller drum 12A. Roller drum 12A is the roller drum 12 in an initial position. Roller drum 12B is the roller drum 12 in a second position exhibiting an amplitude of vibration 34. The amplitude of vibration 34 is the change in position due to vibration. On roller drum 12B, the position 322 is above line 30.

In addition, a vibration frequency is determined from the time period of vibration. For example, the time that it takes for a drum roller 12 to go from the position shown for drum roller 12A to the position shown for drum roller 12B, where drum roller 12B is in a peak amplitude position, and drum roller 12A is in an initial or neutral position, would be a time 40, which would be equivalent to one-quarter of the time period of the vibration. The vibration frequency is then computed as the reciprocal of the time period of the vibration.

Figure 10A:
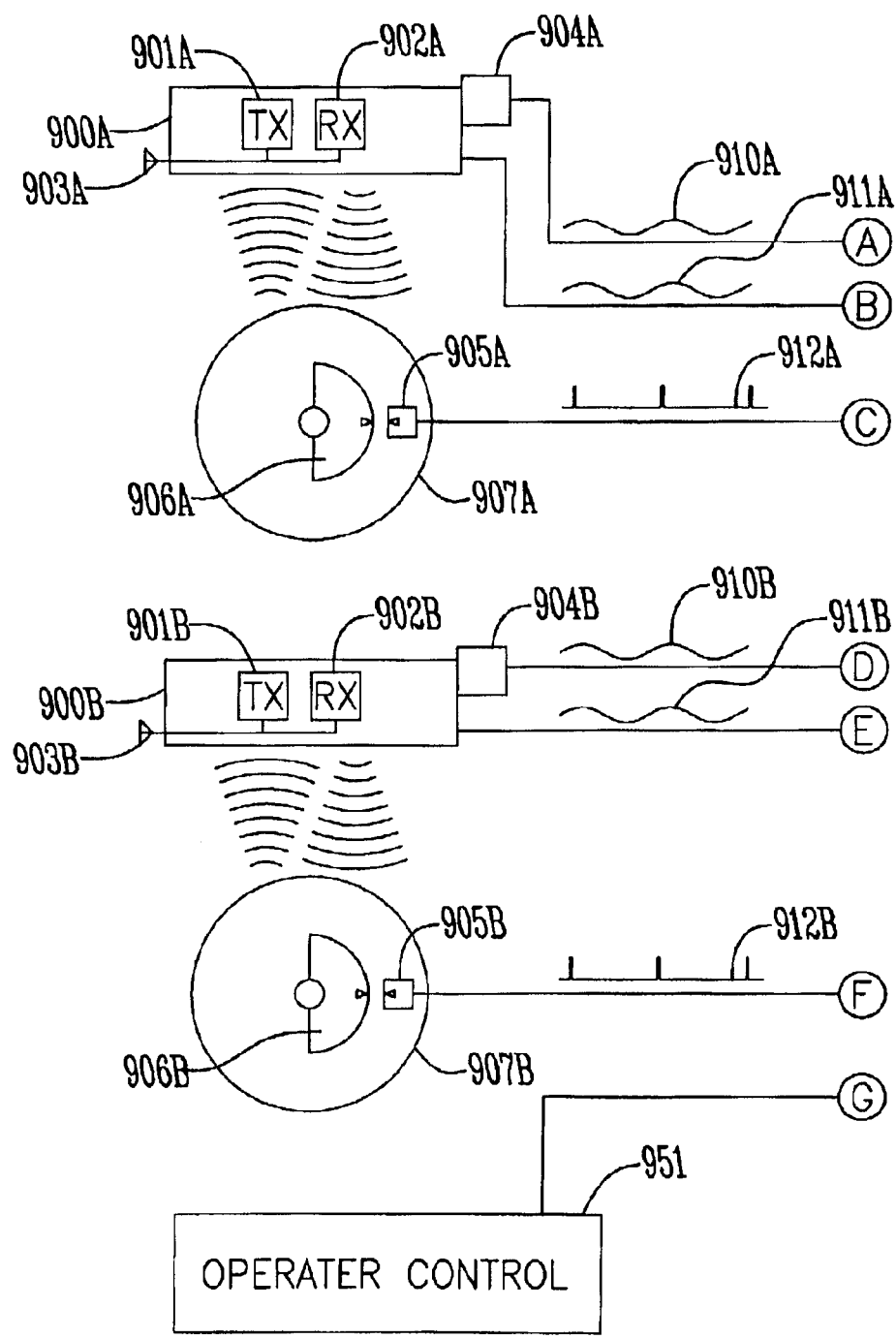
FIGS. 10A and 10B are diagrams showing a system according to the present invention.
Figure 10B:
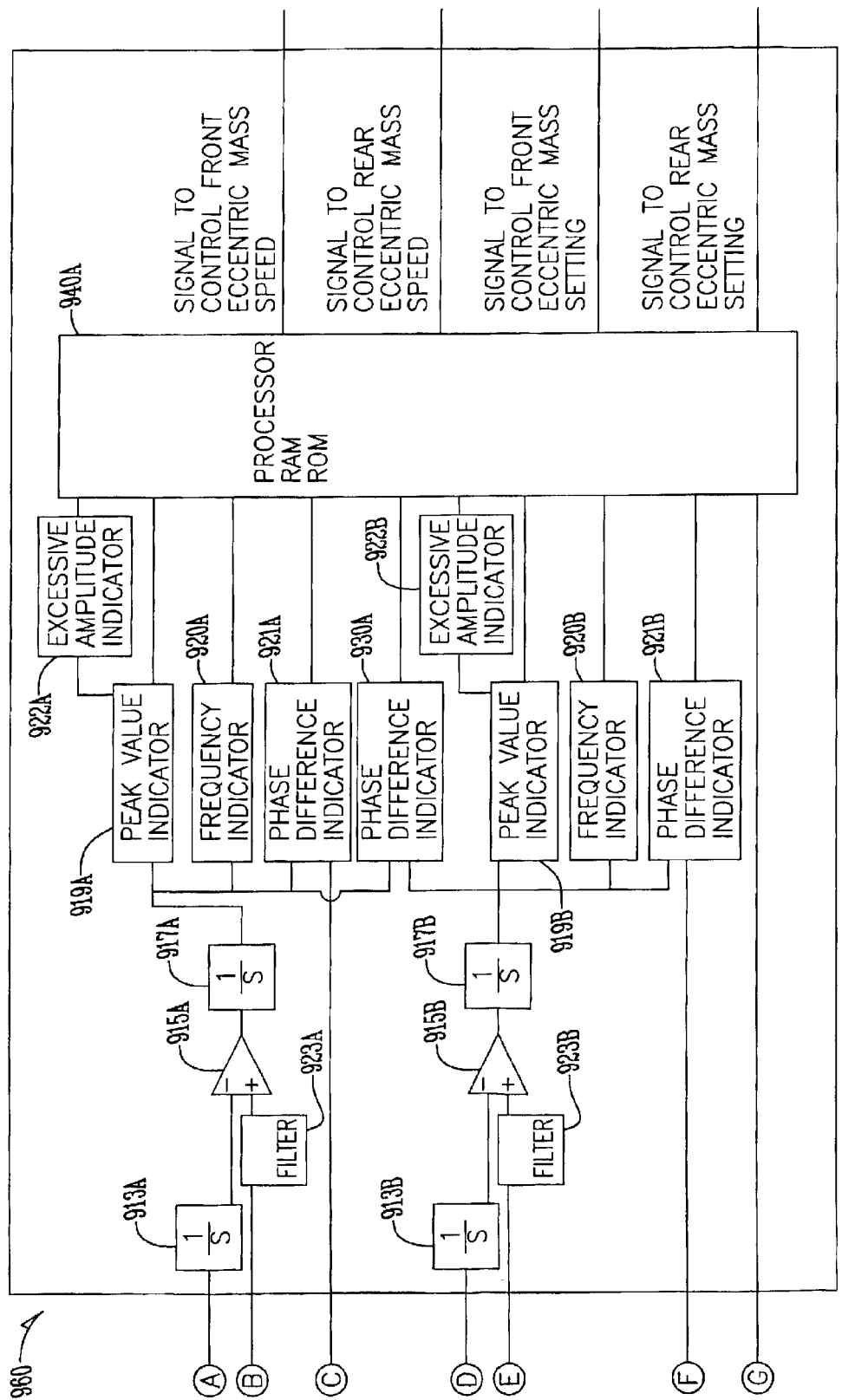

A system of the present invention is shown in figures 10A and 10B. As shown in figures 10A and 10B, the present invention contemplates that one or more roller drums are used. In FIG. 10A, a roller drum 907A is positioned a distance from a sensor 900A. As shown, the sensor uses radar or Doppler shift to determine vibratory motion. The sensor can be a microwave sensor, a light interferometer, a sonic sensor, an inductive sensor, a capacitive sensor, an acoustic sensor, a microphone, a pressure transducer, or other non-contact sensor.

The present invention provides for these various sensor types. Some of these sensor types, including microphones, are passive in nature. Other types involve transmitting a signal directed towards the vibrating element and receiving a reflected signal from the vibrating element. Examples of this sensor type include microwave sensors. All of these sensors do not require any contact with or placement on the vibrating element.

Where a microwave sensor is used, the sensor 900A includes both a receiver portion 902A and a transmitter portion 901A. The receiver portion 902A and the transmitter portion 901A are connected to an antenna. Each may have its own antenna or a single antenna 903A may be used as shown. One example of a Doppler shift radar microwave sensor that can be used according to the present invention is Siemens KMY-24 Microwave Motion Sensor. A similar device is the Siemens KMY-10. The sensor 900A is electrically connected to a control unit 960. The sensor can be adapted to send analog or digital signals to the control unit. Controller Area Network is one such means of digital communication that is contemplated. The control unit 960 can be an intelligent control. For example, the control unit 960 may be an integrated circuit, a portion of an integrated circuit, a controller, a microcontroller, a microcomputer, a digital signal processor, a processor, or other intelligent or analog control. The control unit 960 is electrically connected to the sensor 900A at connection 911A. The control unit 960 is adapted to determine vibratory motion of the roller drum from the information received from sensor 900A and then control the vibration of drum 907A and 907B in order to achieve operator selected goals 950. The vibratory motion can include a vibration amplitude, a vibration frequency, front drum to rear drum phase, drum to eccentric phase, vibration waveform, and detect excessive amplitude.

Where the vibrating element includes an eccentric mass the control unit 960 can be adapted to determine a setting for the eccentric mass. The setting can be selection of one of a plurality of eccentric masses to use, selection of the eccentricity of the mass, or other settings involving one or more eccentric masses.

Further, the system shown in FIGS. 10A and 10B include a second roller drum 907B with a second sensor 900B that is electrically connected to the control unit at interface 911B. The control unit 960 also determines the vibration amplitude, the vibration frequency, a vibrational velocity, a vibrational acceleration, a period of vibration, a drum to eccentric phase, and detect excessive amplitude associated with the second roller drum 907B. Further, where multiple roller drums are used, the control unit 960 determines the vibration phase difference between the roller drums and the angular position difference, speed difference or other differences.

As the system shown provides information that characterizes vibrations, a vibratory compacting machine is capable of improved control. The specific vibration characteristics are monitored so that the speed of an eccentric mass in a roller drum is appropriately altered to result in a vibration selected to improve the compaction process. The mass of the eccentric mass or the eccentricity or other characteristics of the eccentric mass may also be altered to result in a vibration selected to improve the compacting process.

In a two-roller drum system, either the speed of one or both eccentric masses can be altered. The speed of one of the eccentric masses can also be increased or decreased temporarily to provide for an increase or decrease in the phase difference between the vibrations of each roller drum. The eccentric mass can also be adjusted in order to obtain desired performance at any point. Changing the vibration frequency will also change the phase of the eccentric motion to the drum movement thus improving performance. This and other improved control features are contemplated by the present invention as the invention provides for improved monitoring of vibration information and improved control of vibrating systems.

A method and system for non-contact sensing and control of motion of a roller drum or other vibrating element has been disclosed. The present invention contemplates, without limitation, variations in the type of non-contact sensor used, the vibration characteristics determined, and the manner in which the vibrating means of one or more roller drums are altered based on the vibration characteristic.

What is claimed is:

1. A method for non-contact measurement of vibrational motion of a vibrating element in a drum roller comprising:
   sensing a vibration waveform of the roller drum with an active non-contact sensor positioned a distance from the roller drum;
   sensing a change in position of the non-contact sensor with a position sensor; and
   combining the vibration waveform and the change in position to provide a corrected vibration waveform.

2. A system for non-contact measurement of vibrational motion in a vibrating element of a vibratory compaction machine comprising:
   a machine frame;
   a vibrating element coupled to the machine frame adapted for imparting vibrational motion to a surface to be compacted;
   an active non-contact sensor positioned a distance from the vibrating element and adapted for sensing a vibrational motion characteristic of the vibrating element;
   a vibration damping structure coupled between the machine frame and the active non-contact sensor for isolating the sensor from the frame;
   a control unit operatively connected to the active non-contact sensor for receiving the vibrational motion characteristic of the vibrating element; and
   a movement sensor operatively connected to the control unit for determining a movement of the active non-contact sensor, the control unit adapted to correct for error created by the movement of the non-contact sensor.

3. The system of claim 2 wherein the non-contact sensor is selected from the set comprising a microwave sensor, a light interferometer, and inductive sensor, and a capacitive sensor.

4. The system of claim 2 wherein the active non-contact sensor is a Doppler shift sensor.

5. The system of claim 4 wherein the Doppler shift sensor is a microwave sensor.

6. The system of claim 5 further comprising a control unit electrically connected to the microwave sensor.

7. The system of claim 2 wherein the vibrating element includes an eccentric mass.

8. The system of claim 2 wherein the vibrating element is a roller drum.

9. The system of claim 2 wherein the vibrating element is a plate.

10. The system of claim 2 wherein the vibrating element includes and eccentric mass and the control unit is adapted to determine an eccentric mass setting.

11. The system of claim 2 wherein the movement sensor is an accelerometer.

12. A method of operating a vibratory compacting machine comprising the steps of:

providing a vehicle frame;

providing a roller drum movably coupled to the vehicle frame, wherein the roller drum has a frequency range over which it vibrates;

mounting a sensor using a vibration isolator that is designed such that the frequency at which the vibration isolator vibrates is not within the same frequency range as the drum vibration;

inducing vibrations on the vibratory drum to cause the vibratory drum to compact a material;

measuring vibrations using the sensor;

generating a waveform representing the measured vibrations; and filtering out frequency components at the frequency at which the vibration isolator vibrates to generate a second waveform representing the vibration of the roller drum.

13. The method of claim 12 wherein the step of measuring vibrations includes the steps of sending a signal towards the rolling drum and receiving a reflected signal from the roller drum.

14. The method of claim 12, further comprising the step of determining a plurality of vibrational characteristics of the roller drum.

15. The method of claim 14, wherein at least one of the vibrational characteristics is selected from the set comprising: an amplitude of vibration, a frequency of vibration, a phase of vibration, a vibrational velocity, and a vibrational acceleration.

16. The method of claim 12, wherein the roller drum vibrates at a frequency of approximately 60 Hz.

17. The method of claim 16, wherein the vibration isolator vibrates at approximately 8 Hz.

18. The method of claim 12, wherein the frequency range of the roller drum is greater than the frequency of the vibration isolator.

19. The method of claim 12, wherein the sensor is a non-contact sensor.

20. The method of claim 19, wherein the non-contact sensor is a Doppler shift sensor.

21. The method of claim 19, wherein the non-contact sensor is a microwave sensor.

22. A vibratory compacting machine comprising:

a frame;

a vibrating element coupled to the frame, wherein the vibrating element has a frequency range over which it vibrates;

a sensor coupled to the frame with a vibration isolator that is designed such that the frequency at which the vibration isolator vibrates is not within the frequency range of the vibrating element;

a control unit electrically connected to the sensor for receiving signals relating to measured vibrations; and a filter for filtering out frequency components at the frequency at which the vibration isolator vibrates.

23. The vibratory compacting machine of claim 22, wherein the sensor is a non-contact sensor.

24. The vibratory compacting machine of claim 23, wherein the non-contact sensor is a Doppler shift sensor.

25. The vibratory compacting machine of claim 23, wherein the non-contact sensor is a microwave sensor.

26. The vibratory compacting machine of claim 22, wherein the vibrating element is a roller drum.

27. The vibratory compacting machine of claim 22, wherein the vibrating element is a plate.

28. A method of operating a vibratory compacting machine comprising the steps of:

providing a vehicle frame;

providing a vibratory drum movably coupled to the vehicle frame;

inducing vibrations on the vibratory drum to cause the vibratory drum to compact a material;

providing a first sensor coupled to the vehicle frame;

using the first sensor to sense the vibrations induced on the vibratory drum;

providing a second sensor;

using the second sensor to sense vibrations in the first sensor caused by vibrations in the vehicle frame which are due to the induced vibrations; and adjusting the speed and/or amplitude of the induced vibrations based on information from the first and second sensors.

29. The method of claim 28, wherein the step of using the first sensor to sense the vibrations includes sending a signal towards the vibratory drum and receiving a reflected signal from the vibratory drum.

30. The method of claim 28, wherein the first sensor is a non-contact sensor.

31. The method of claim 30, wherein the first sensor is passive.

32. The method of claim 30, wherein the first sensor is a Doppler shift sensor.

33. The method of claim 30, wherein the first sensor is a microwave sensor.

* * * * *